(12) United States Patent
Hirano et al.

(10) Patent No.: US 9,132,818 B2
(45) Date of Patent: Sep. 15, 2015

(54) FLUID PRESSURE BOOSTER FOR BRAKING DEVICE

(75) Inventors: Risa Hirano, Ueda (JP); Kouji Sakai, Ueda (JP); Kenji Suzuki, Wako (JP)

(73) Assignees: NISSIN KOGYO CO., LTD, Nagano (JP); HONDA MOTOR CO., LTD., Tokyo (JP)

( * ) Notice: Subject to any disclaimer, the term of this patent is extended or adjusted under 35 U.S.C. 154(b) by 832 days.

(21) Appl. No.: 13/325,721

(22) Filed: Dec. 14, 2011

(65) Prior Publication Data

US 2012/0174575 A1    Jul. 12, 2012

(30) Foreign Application Priority Data

Dec. 24, 2010   (JP) ................................. 2010-288306

(51) Int. Cl.
   *B60T 13/14*    (2006.01)
   *B60T 8/48*     (2006.01)

(52) U.S. Cl.
   CPC ............. *B60T 13/145* (2013.01); *B60T 8/4845* (2013.01)

(58) Field of Classification Search
   CPC .................................................. B60T 13/145
   USPC ....................... 60/548, 553; 91/370, 372, 373
   See application file for complete search history.

(56) References Cited

FOREIGN PATENT DOCUMENTS

| JP | 11-059395 A    | 3/1999  |
|----|----------------|---------|
| JP | 2000-203407 A  | 7/2000  |
| JP | 2006-282013 A  | 10/2006 |
| JP | 2009-234525 A  | 10/2009 |

OTHER PUBLICATIONS

Japanese Office Action, Japanese Patent Application No. 2010-288306 dated Dec. 12, 2012.

*Primary Examiner* — F. Daniel Lopez
(74) *Attorney, Agent, or Firm* — Arent Fox LLP

(57) ABSTRACT

A fluid pressure booster for a braking device includes a control piston on which an input brake operation acts in an advancing direction, and a reaction force based on fluid pressure of a booster fluid pressure generation chamber acts in a retracting direction. A pressure increasing valve is provided between a valve chamber communicating with a fluid pressure generation source and the booster fluid pressure generation chamber. A pressure reducing valve is provided between a release chamber communicating with a reservoir and the booster fluid pressure generation chamber. At least one contraction portion is formed between an outer periphery of a front portion of the pressing rod and an inner periphery of a front portion of a valve seat member.

6 Claims, 4 Drawing Sheets

FLUID PRESSURE BOOSTER FOR BRAKING DEVICE

BACKGROUND OF THE INVENTION

1. Field of the Invention

The present invention relates to a fluid pressure booster for a braking device, including: a control piston on which an input brake operation acts in an advancing direction, and a reaction force based on fluid pressure of a booster fluid pressure generation chamber that generates fluid pressure for actuating a master piston of a master cylinder acts in a retracting direction; a pressure increasing valve that has at least a cylindrical valve seat member which is provided, at a front end thereof, with a valve seat facing a valve chamber communicating with a fluid pressure generation source, a valve body that is urged by a spring toward a side where the valve body is seated on the valve seat and is housed in the valve chamber, and a pressing rod that is coaxially inserted in the valve seat member to be able to push the valve body with the front end so that the valve body is separated from the valve seat, opens according to the advance of the control piston, and is provided between the valve chamber and the booster fluid pressure generation chamber; and a pressure reducing valve provided between a release chamber communicating with a reservoir and the booster fluid pressure generation chamber to close at a time of advance of the control piston and open at a time of retraction of the control piston.

2. Description of the Related Art

According to, for example, Japanese Patent Application Laid-open No 2009-234525, a fluid pressure booster for a braking device is already known, which is configured such that at least part of a pressure increasing valve presses a valve body using a pressing rod that advances according to the input brake operation to separate the valve body from a valve seat at a front end of a cylindrical valve seat member to open the valve.

However, at an early stage of opening of the pressure increasing valve, a large fluid pressure difference occurs between the fluid pressure generation source and the booster fluid pressure generation chamber. When an abrupt fluid pressure flow occurs based on the fluid pressure difference at the early stage of opening of the pressure increasing valve, the working sound thereof is likely to be sensed and/or heard as an abnormal sound.

SUMMARY OF THE INVENTION

The present invention was attained in view of the above-mentioned circumstances, and has an ASPECT to provide a fluid pressure booster for a braking device which can prevent generation of an abnormal sound due to abrupt fluid pressure flow at a time of opening of a pressure increasing valve.

In order to achieve the noted aspect, according to a first feature of the present invention, there is provided a fluid pressure booster for a braking device, including: a control piston on which an input brake operation acts in an advancing direction, and a reaction force based on fluid pressure of a booster fluid pressure generation chamber that generates fluid pressure for actuating a master piston of a master cylinder acts in a retracting direction; a pressure increasing valve that has at least a cylindrical valve seat member which is provided, at a front end thereof, with a valve seat facing a valve chamber communicating with a fluid pressure generation source, a valve body that is urged by a spring toward a side where the valve body is seated on the valve seat and is housed in the valve chamber, and a pressing rod that is coaxially inserted in the valve seat member to be able to push the valve body with the front end so that the valve body is separated from the valve seat, opens according to the advance of the control piston, and is provided between the valve chamber and the booster fluid pressure generation chamber, and a pressure reducing valve provided between a release chamber communicating with a reservoir and the booster fluid pressure generation chamber to close at a time of advance of the control piston and open at a time of retraction of the control piston, wherein at least one contraction portion is formed between an outer periphery of a front portion of the pressing rod and an inner periphery of a front portion of the valve seat member.

According to the first feature of the present invention, at least one contraction portion is formed between the outer periphery of the front portion of the pressing rod and the inner periphery of the front portion of the valve seat member. Thus, the flow velocity is suppressed in the contraction portion even if a large fluid pressure difference occurs between the fluid pressure generation source and the booster fluid pressure generation chamber at an early stage of the pressure increasing valve opening. Thus, abrupt fluid pressure variation does not occur at the early stage of the pressure increasing valve opening, and generation of an abnormal sound is suppressed.

According to a second feature of the present invention, in addition to the first feature, the front portion of the pressing rod integrally includes: a pressing shaft portion that movably penetrates through a valve hole which opens in a central portion of the valve seat and which is provided at the front end of the valve seat member and that is capable of abutting against the valve body with a front end; a circular truncated cone portion that is coaxially continuous with a rear end of the pressing shaft portion and having, on an outer periphery, a taper surface with an outside diameter that gets larger in a direction extending toward a rear; and a straight portion having an outer peripheral surface with the same outside diameter as a large diameter end of the taper surface. The contraction portion is formed between the inner periphery of the valve seat member and the outer periphery of the straight portion at least with advance of the pressing rod.

Further, according to the second feature of the present invention, the contraction portion is formed between the straight portion of the front portion of the pressing rod and the inner periphery of the valve seat member at least with advance of the pressing rod. Thus, the flow velocity of the working fluid is reduced by the pressing rod advancing at the place near the valve hole of the pressure increasing valve, and generation of a working sound is suppressed.

According to a third feature of the present invention, in addition to the first or second feature, a plurality of contraction portions, including the afore-mentioned contraction portion, are formed to be side by side in series between the outer periphery of the pressing rod and the inner periphery of the valve seat member.

According to a fourth feature of the present invention, in addition to the third feature, the valve seat member is provided with a small diameter hole portion, and at least one large diameter hole portion that is coaxially disposed rearward of the small diameter hole portion and is formed to have a diameter larger than that of the small diameter hole portion. The contraction portions are formed, respectively, between the outer periphery of the pressing rod, and inner peripheries of the small diameter hole portion and the large diameter hole portion.

According to the third or fourth feature of the present invention, a plurality of contraction portions arranged in series are formed between the outer periphery of the pressing rod and the inner periphery of the valve seat member. Thus, the working fluid that flows toward the booster fluid pressure generation chamber with the pressure increasing valve opening passes through the plurality of contraction portions. As such, an abrupt fluid pressure variation is more effectively suppressed, and generation of an abnormal sound is suppressed.

Here, a rear master piston 23 corresponds to the master piston of the present invention; a first valve seat 118 corresponds to the valve seat of the present invention; and a small diameter straight portion 124d corresponds to the straight portion of the present invention.

The above and other aspects, characteristics and advantages of the present invention will be clear from detailed descriptions of the preferred embodiment which will be provided below while referring to the attached drawings

DESCRIPTION OF THE PREFERRED EMBODIMENT

Figure 1:
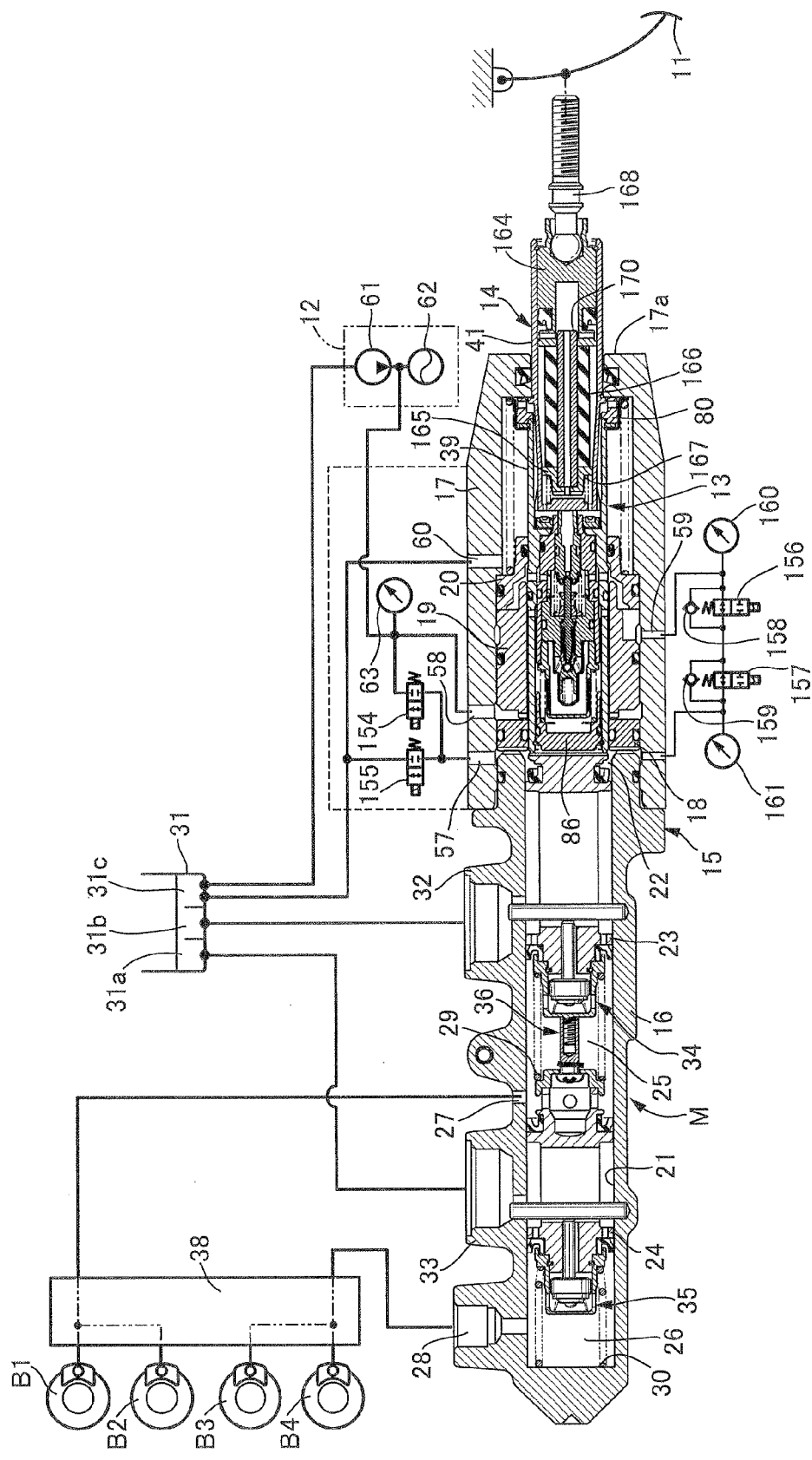
FIG. 1 is a schematic diagram showing the configuration of a braking device for a vehicle according to the present invention.

Looking at FIG. 1, a four-wheel vehicle braking device includes a tandem type master cylinder M, a fluid pressure booster 13 and a stroke simulator 14. The fluid pressure booster 13 regulates fluid pressure in a fluid pressure generation source 12 according to a brake operation force input from a brake pedal 11 to work the fluid pressure on the master cylinder M. The stroke simulator 14 is provided between the brake pedal 11 and the fluid pressure booster 13.

A casing 15 common to the master cylinder M and the fluid pressure booster 13 includes a bottomed cylindrical cylinder body 16 with a closed front end, and a cylindrically shaped rear body 17 having an inward flange 17a at a rear end thereof and being coaxially connected to a rear portion of the cylinder body 16. A rear end of the cylinder body 16 is fluid-tightly fitted to a front portion of the rear body 17. A separator 18, a first sleeve 19 and a second sleeve 20, which are fluid-tightly fitted to the rear body 17, are positioned between the rear end of the cylinder body 16 and the rear body 17 with the first sleeve 19 being positioned between the separator 18 and the second sleeve 20.

A first cylinder hole 21 having a closed front end is defined in the cylinder body 16. The master cylinder M is formed by having a rear master piston 23, which has a rear surface facing a booster fluid pressure working chamber 22. The rear master piston 23 is urged backward by a spring, and is slidably fitted in the first cylinder hole 21. A front master piston 24, which is urged backward by a spring and is placed forward of the rear master piston 23, is slidably fitted in the first cylinder hole 21. A rear output fluid pressure chamber 25 is formed between the rear master piston 23 and the front master piston 24, and a front output fluid pressure chamber 26 is formed between a closed portion of a front end of the cylinder body 16 and the front master piston 24.

The cylinder body 16 is provided with a rear output port 27, which communicates with the rear output fluid pressure chamber 25, and a front output port 28, which communicates with the front output fluid pressure chamber 26. Further, a rear return sprint 29, which urges the rear master piston 23 backward, is provided in a compressed manner between the rear master piston 23 and the front master piston 24 in the rear output fluid pressure chamber 25. A front return spring 30, which urges the master piston 24 backward, is provided in a compressed manner between the closed end of the front portion of the cylinder body 16 and the front master piston 24 in the front output fluid pressure chamber 26.

A reservoir 31 is annexed to the master cylinder M. First, second, and third reservoir chambers 31a, 31b and 31c are formed within the reservoir wherein the chambers 31a, 31b and 31c are formed partitioned from one another. A cylindrical rear connection cylinder portion 32, which communicates with the second reservoir chamber 31b, and a cylindrical front connection cylinder portion 33, which communicates with the first reservoir chamber 31a, are integrally provided with the cylinder body 16 and protrude upwardly and away from the cylinder body 16 so that working fluid from the reservoir 31 is supplied to the rear output fluid pressure chamber 25 through the rear connection cylinder portion 32, and working fluid from the reservoir 31 is supplied to the front output fluid pressure chamber 26 through the front connection cylinder portion 33.

A center valve 34, which opens when the rear master piston 23 returns to a retraction limit position and returns the working fluid of the rear output fluid pressure chamber 25 to the rear connection cylinder portion 32, is mounted to the rear master piston 23. A center valve 35, which returns the working fluid of the front output fluid pressure chamber 26 to the front connection cylinder portion 33 side when the front master piston 24 returns to the retraction limit position, is mounted to the front master piston 24. Further, maximum space restricting means 36, which restricts a maximum space between the master pistons 23 and 24, is provided between the rear and front master pistons 23 and 24.

The rear output port 27 is connected to a right front wheel brake B1 and a left rear wheel brake B2 via a fluid pressure modulator 38. The front output port 28 is connected to a left front wheel brake B3 and a right rear wheel brake B4 via the fluid pressure modulator 38. Thus, the fluid pressure modulator 38 is a conventionally known pressure modulator that can freely control the working fluid pressure output from the rear and front output ports 27 and 28 to perform anti-lock brake control at the time of brake operation and to perform automatic brake control, such as traction control, in a non-braking operation state.

Figure 2:
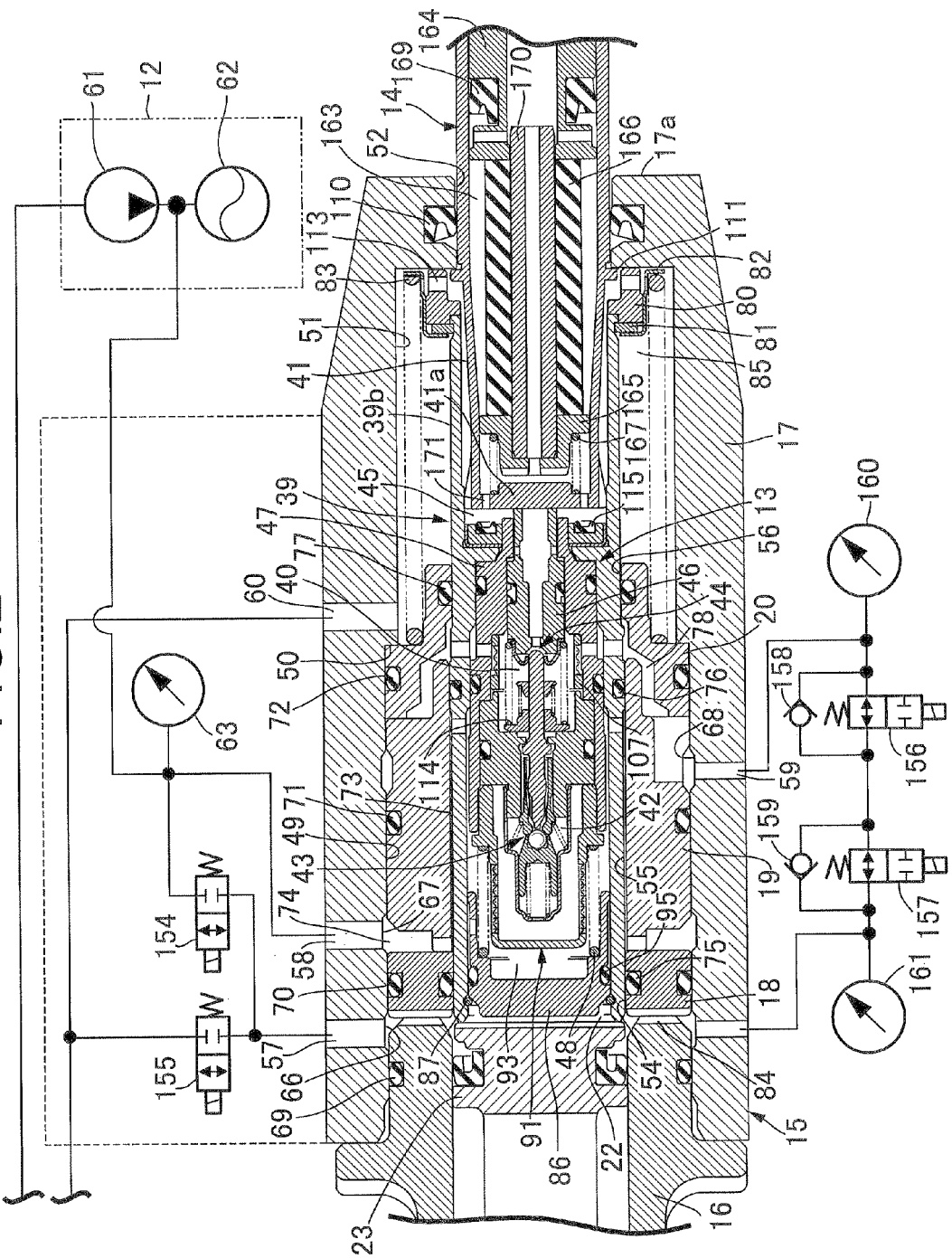
FIG. 2 is a longitudinal cross-sectional view of a fluid pressure booster and a stroke simulator.

Looking at FIG. 2, the fluid pressure booster 13 includes: a cylindrical backup piston 39 having a front end facing the booster fluid pressure working chamber 22 and which is slidably housed in the body 17 of the casing 15; a control piston 41 on which the brake operation input acts in the advancing direction and on which a reaction force based on fluid pressure in a booster fluid pressure generation chamber 40 connected to the booster fluid pressure working chamber 22 acts in the retracting direction; a pressure increasing valve 43 provided between a valve chamber 42 communicating with the fluid pressure generation source 12 and the booster fluid pressure generation chamber 40 opens in response to the control piston 41 advancing and closes when the control piston 41 retracts; a pressure reducing valve 44 provided between a release chamber 45 communicating with the third oil reservoir chamber 31c and the booster fluid pressure generation chamber 40 closes when the control piston 41 advances and opens when the control piston 41 retracts; a first reaction piston 46 applies a reaction force based on the fluid pressure of the booster fluid pressure generation chamber 40 to the control piston 41; and a second reaction piston 47 provided between the backup piston 39 and the first reaction piston 46 applies the output fluid pressure of the fluid pressure generation source 12 and reaction force from a reaction spring 48 to the control piston 41 in addition to the reaction force from the first reaction piston 46 when the brake operation input by the brake pedal 11 is increased.

Figure 3:
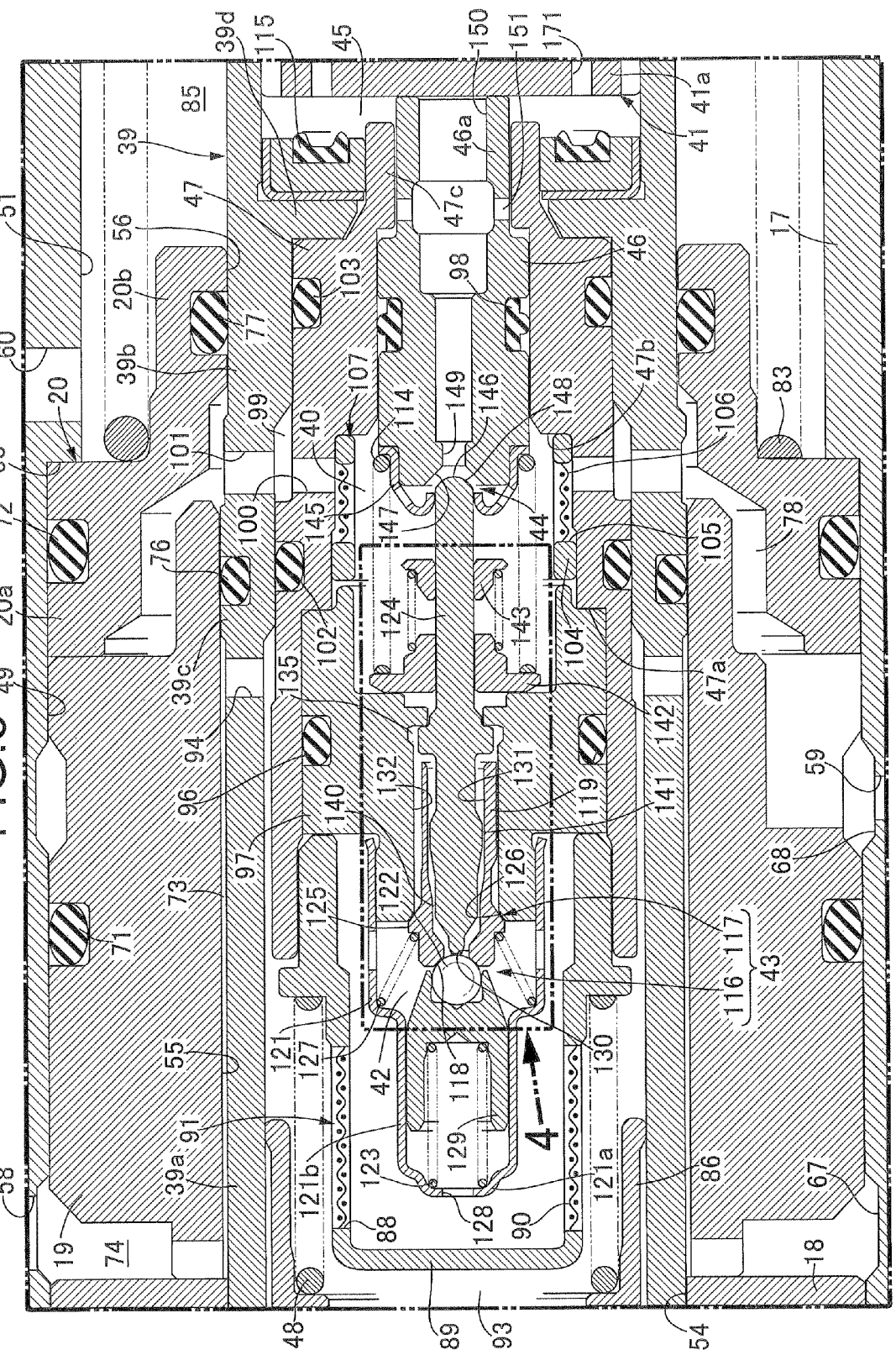
FIG. 3 is an enlarged longitudinal cross-sectional view of the fluid pressure booster shown in FIG. 2.

With reference to FIG. 3, a large diameter hole 49 defined in the body 17 fluid-tightly fits therein the rear end of the cylinder body 16, the separator 18, the first sleeve 19, and the second sleeve 20 from the front end. A medium diameter hole 51 defined in the body 17 and having a smaller diameter than the large diameter hole 49 forms an annular step 50 between the medium diameter hole 51 and the rear end of the large diameter hole 49, and is coaxially connected to the rear end of the large diameter hole 49. The inward flange 17a defines a rear end of the medium diameter hole 51 and forms a small diameter hole 52 having a diameter smaller than that of the medium diameter hole 51.

The separator 18, the first sleeve 19, and the second sleeve 20 are fluid-tightly fitted in the large diameter hole 49 and held between the rear end of the cylinder body 16 in the master cylinder M and the step 50. The separator 18 is formed into a short cylindrical shape with an inner periphery forming a second cylinder hole 54 having a diameter slightly smaller than that of the first cylinder hole 21 formed in the cylinder body 16. The first sleeve 19 has a cylindrical shape and defines a third cylinder hole 55 having the same diameter as the first cylinder hole 21. Further, the second sleeve 20 has a stepped cylindrical shape and is integrally provided with a large diameter portion 20a fitted in the large diameter hole 49 of the body 17, and a small diameter portion 20b that defines a fourth cylinder hole 56 having a diameter smaller than the diameter of the third cylinder hole 55 and which extends backward from the large diameter portion 20a. The rear end of the large diameter portion 20a abuts against the step 50. Thus, the separator 18, the first sleeve 19, and the second sleeve 20 fluid-tightly, which are fitted and fixed into the body 17, form the second to fourth cylinder holes 54, 55 and 56, which are coaxial with the first cylinder hole 21, sequentially from the front.

The backup piston 39 is integrally provided with a front small diameter portion 39a slidably fitted in the second cylinder hole 54, a rear small diameter portion 39b having an outside diameter slightly smaller than the front small diameter portion 39a and slidably fitted in the fourth cylinder hole 56, and a middle large diameter portion 39c that connects the front small diameter portion 39a and the rear small diameter portion 39b and is slidably fitted in the third cylinder hole 55. The backup piston 39 is formed into a stepped cylindrical shape with the middle large diameter portion 39c having a diameter larger than the front small diameter portion 39a and the rear small diameter portion 39b.

The body 17 is provided with several ports. A connection port 57 opens into an inner surface of the large diameter hole 49 in a position corresponding to a portion between the cylinder body 16 of the master cylinder M and the separator 18. An input port 58 opens into the inner surface of the large diameter hole 49 in a position corresponding to a portion between the separator 18 and the first sleeve 19. An output port 59 opens into the inner surface of the large diameter hole 49 in an axially middle portion of the first sleeve 19. A release port 60 opens into a front inner surface of the medium diameter hole 51, with spaces therebetween in sequence from the front.

The fluid pressure generation source 12 is connected to the input port 58. The fluid pressure generation source 12 includes a pump 61 for drawing the working fluid from the third reservoir chamber 31c of the reservoir 31, and an accumulator 62, which is connected to a discharge side of the pump 61. Actuation of the pump 61 is controlled in accordance with the detection value of a fluid pressure sensor 63, which detects fluid pressure of the accumulator 62. Thus, a constant high fluid pressure is fed to the input port 58 from the fluid pressure generation source 12. Further, the release port 60 is connected to the third fluid reservoir chamber 31c of the reservoir 31.

The inner surface of the large diameter hole 49 in the body 17 has an annular recess 66 in open communication with an inner end of the connection port 57, an annular recess 67 in open communication with an inner end of the input port 58, and an annular recess 68 in open communication with an inner end of the output port 59. O-rings 69, 70, 71 and 72 are annular seal members that seal the annular recesses 66, 67 and 68 from opposite sides and are mounted to the outer peripheries of the cylinder body 16, the separator 18, the first sleeve 19 and the second sleeve 20.

The front small diameter portion 39a of the backup piston 39 is fluid-tightly and slidably fitted in the second cylinder hole 54 of the separator 18. The middle large diameter portion 39c of the backup piston 39 is fluid-tightly and slidably fitted in the third cylinder hole 55 of the first sleeve 19. An annular passage 73 is formed between the outer periphery of the front small diameter portion 39a and the inner periphery of the first sleeve 19. A channel 74 in open communication with the annular passage 73 is formed between the separator 18 and the first sleeve 19. The channel 74 facilitates the annular recess 67 to also communicate with the annular passage 73.

In addition, front and rear sides of the annular passage 73 are sealed by an o-ring 75 mounted between the separator 18 and the backup piston 39, and an o-ring 76 mounted between the first sleeve 19 and the backup piston 39. The o-ring 75 is mounted to the inner surface of the separator 18, that is, the inner surface of the second cylinder hole 54, and is brought into resilient sliding contact with the outer periphery of the front small diameter portion 39a in the backup piston 39. The o-ring 76 is mounted to the outer surface of the middle large diameter portion 39c in the backup piston 39 and is brought into resilient contact with the inner surface of the third cylinder hole 55, that is, the inner periphery of the first sleeve 19.

An o-ring 77 that resiliently contacts the outer periphery of the rear small diameter portion 39b of the backup piston 39 is mounted to the inner periphery of the small diameter portion 20b in the second sleeve 20, that is, the inner surface of the fourth cylinder hole 56. A channel 78 having an outer end communicating with the annular recess 68 provided in the inner surface of the body 17 and which communicates with the output port 59 is provided in the first and second sleeves 19 and 20. Ends of the channel 78 which open to the inner periphery of the first sleeve 19 and to the inner periphery of the small diameter portion 20b in the second sleeve 20 are sealed from both front and rear sides with the o-rings 76 and 77.

Also in FIG. 2, a ring-shaped stopper 80 abuts against the inward flange 17a. A coil spring 83 surrounding a rear half of the backup piston 39 is provided in a compressed manner between a retainer 82, which has an inner periphery abutting against and engaged with, from the front, a snap ring 81 mounted to the outer periphery of the rear end of the rear small diameter portion 39b and the second sleeve 20. The backup piston 39 is urged backward by a spring force of the spring 83. Thus, the location where the snap ring 81 abuts against the stopper 80, which abuts against the inward flange 17a, defines a retraction limit of the backup piston 39. The front end of the backup piston 39 at the retraction limit faces the booster fluid pressure working chamber 22, and abuts against the entire outer peripheral edge of the rear surface of the rear master piston 23 in a non-operation state, and in this state, the rear master piston 23 is also at the retraction limit.

Grooves, which define a plurality of passages 84 that provide communication between the annular recess 66, the connection port 57, and the booster fluid pressure working chamber 22 between the opposing end surfaces of the cylinder body 16 and the separator 18, are provided in the rear end surface of the cylinder body 16 and the front end surface of the separator 18, and extend in the radial direction. Thus, the connection port 57 communicates with the booster fluid pressure working chamber 22 through the annular recess 66 and the passages 84.

Between the second sleeve 20 and the inward flange 17a, a spring chamber 85 is formed. The spring chamber 85 surrounds the backup piston 39, and houses the spring 83, wherein the spring chamber 85 communicates with the release port 60.

An inward flange 39d, which protrudes radially inward, is integrally provided in the inner surface of the axially middle portion of the backup piston 39. The stepped cylindrical second reaction piston 47 is slidably fitted to the backup piston 39 so that the retraction limit is restricted by the inward flange 39d. The first reaction piston 46 is coaxially and relatively slidably fitted to the second reaction piston 47.

An end wall member 86 having a front surface facing the booster fluid pressure working chamber 22 is fluid-tightly fitted to the front end portion of the backup piston 39. A snap ring 87 that abuts against and engages with an outer peripheral edge of the end wall member 86 from the front is mounted to the inner periphery of the front end portion of the backup piston 39. Further, a filter 91, which includes mesh members 90 provided in a plurality of openings 88 defined in a filter frame 89 that is formed into a bottomed cylindrical shape, is mounted to the front end of the second reaction piston 47. The second reaction piston 47 is urged to the side where the second reaction piston 47 abuts against the inward flange 39d from the front by the spring force of the reaction spring 48 provided in a compressed manner between the filter 91 and the end wall member 86.

An input chamber 93 is defined in the backup piston 39 between the second reaction piston 47, the filter 91, and the end wall member 86. The input chamber 93 communicates with the annular passage 73 via a communication hole 94 provided in the backup piston 39. More specifically, the high pressure working fluid from the fluid pressure generation source 12 is introduced into the input chamber 93. An o-ring 95, which seals a gap between the input chamber 93 and the booster fluid pressure working chamber 22, and which comes into resilient contact with the inner periphery of the backup piston 39, is mounted to an outer periphery of the end wall member 86.

With reference to FIG. 3, an annular step 47a facing forward is provided in the inner surface of the middle portion of the second reaction piston 47. A stepped cylindrical valve housing 97 having, in an outer periphery thereof, an o-ring 96, which resiliently contacts the inner periphery of the second reaction piston 47, is fitted to the front portion of the second reaction piston 47 and abuts against the step 47a. The valve housing 97 is held between the filter frame 89, which is urged rearward by the reaction spring 48, and the front end of the second reaction piston 47a. Thereby, the valve housing 97 is fluid-tightly fitted and fixed to the front portion of the second reaction piston 47, and is supported by the backup piston 39 via the second reaction piston 47.

Meanwhile, the first reaction piston 46 has, in the outer periphery thereof an annular seal member 98, which resiliently contacts the inner periphery of the rear portion of the second reaction piston 47 and is slidably fitted to the rear portion of the second reaction piston 47. The booster fluid pressure generation chamber 40 is formed in the second reaction piston 47 and faces the rear surface of the valve housing 97 and the front end of the first reaction piston 46. An annular chamber 99 is defined between the outer periphery of the second reaction piston 47 and the inner periphery of the backup piston 39. The booster fluid pressure generation chamber 40 communicates with the annular chamber 99 via a communication hole 100 defined in the second reaction piston 47. Further, a communication hole 101 that provides communication between the annular chamber 99 and the channel 78 is defined in the rear small diameter portion 39b of the backup piston 39. The booster fluid pressure generation chamber 40 communicates with the output port 59 via the communication hole 100, the annular chamber 99, the communication hole 101 and the channel 78. Further, o-rings 102 and 103 located in front of and behind the annular chamber 99 are mounted to the outer periphery of the second reaction piston 47 and resiliently contact the inner periphery of the backup piston 39.

A filter 107, which includes mesh members 106 provided in a plurality of openings 105 defined in a filter frame 104 that is formed into a cylindrical shape, is fitted to the second reaction piston 47 between the rear end of the valve housing 97 and the annular step 47b provided in the inner periphery of the second reaction piston 47 and facing forward. The filter 107 is mounted between the booster fluid pressure generation chamber 40 and the communication hole 100.

With reference to FIG. 2, the control piston 41 is formed into a bottomed cylindrical shape having an end wall 41a at a front end thereof, and is coaxially inserted into the rear small diameter portion 39b of the backup piston 39 while slidably fitted in the small diameter hole 52 formed by the inward flange 17a of the rear end of the body 17. Further, an annular seal member 110, which resiliently contacts the outer periphery of the control piston 41, is mounted to the inner periphery of the inward flange 17a, that is, the inner surface of the small diameter hole 52. A restriction protrusion 111, which abuts against and engages the inner peripheral edge of the inward flange 17a from the front to restrict the retraction limit of the control piston 41, is integrally provided in the outer surface of the control piston 41 in a protruding manner over the entire periphery. Thus, when the fluid pressure of the fluid pressure generation source 12 decreases, the restriction protrusion 111 presses the backup piston 39 in the advancing direction via the stopper 80 in response to the advance of the control piston 41 by the brake operation input. Accordingly, the backup piston 39 directly pushes the rear master piston 23 of the master cylinder M.

The release chamber 45 is defined between the inward flange 39d, the backup piston 39, and the control piston 41. The release chamber 45 communicates with the spring chamber 85 via a communication hole 113 defined in the stopper 80. More specifically, the release chamber 45 communicates with the third reservoir chamber 31c via the communication hole 113, the spring chamber 85, and the release port 60.

The first reaction piston 46 coaxially and integrally includes an extended cylindrical portion 46a extending backward beyond the inward flange 39d of the backup piston 39. A rear end of the extended cylindrical portion 46a abuts against the end wall 41a of the front end of the control piston 41. Further, a spring 114, which exerts a spring force, which urges the rear end of the first reaction piston 46, that is, the rear end of the extended cylindrical portion 46a, into contact with the end wall 41a of the control piston 40, is housed in the booster fluid pressure generation chamber 40. The spring force of the spring 114 is set to an extremely small value.

The second reaction piston 47 is coaxially and integrally provided with an extended cylindrical portion 47c that coaxially surrounds the extended cylindrical portion 46a of the first reaction piston 46 and extends backward beyond the inward flange 39d. In a state in which the second reaction piston 47 abuts against the inward flange 39d and is located at the retraction limit position, a rear end of the extended cylindrical portion 47c is located rearward of a seat stopper 115 that abuts against the inward flange 39d and is fixed to the backup piston 39, and is forward of the rear end of the extended cylindrical portion 46a.

Thus, at the time of an advancing operation of the control piston 41 relative to the backup piston 39, the first reaction piston 46 advances together with the control piston 41, and the rear end of the second reaction piston 47 abuts against the end wall 41a when the brake operation input by the brake pedal 11 is increased, wherein the amount of advancing movement of the control piston 41 becomes a predetermined value or more.

Figure 4:
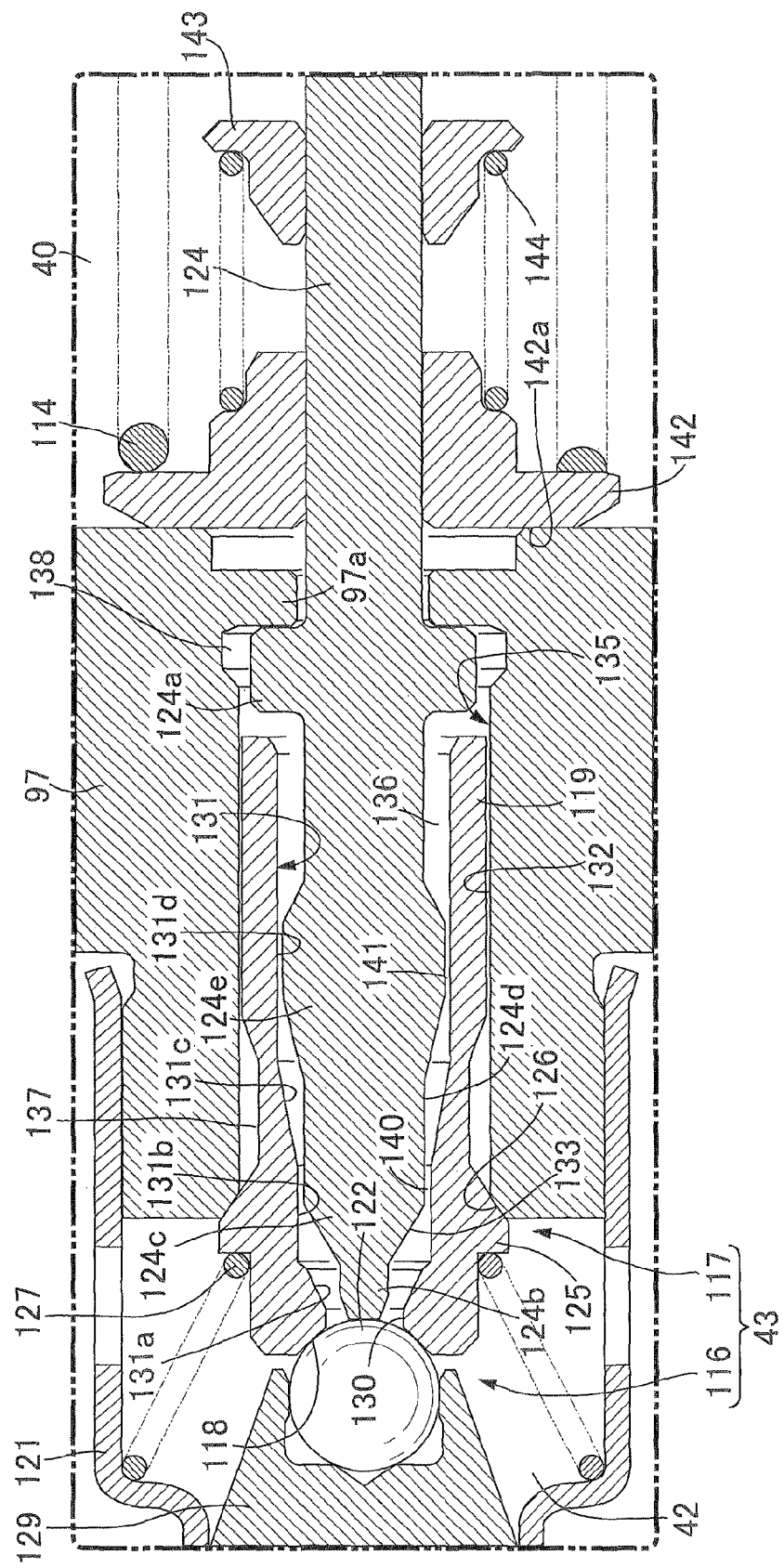
FIG. 4 is an enlarged view of a pressure increasing valve shown in FIG. 3.

In FIG. 4, the pressure increasing valve 43 includes first and second valve means 116 and 117 arranged side by side in the axial direction of the control piston 41 and which open sequentially according to an increase in the brake operation input from the brake pedal 11. A seal diameter of the second valve means 117 is set to be larger than a seal diameter of the first valve means 116. The second valve means 117 is designed to start opening before a rate of flow from the opened first valve means 116 reaches a maximum.

The first valve means 116 includes a cylindrical valve seat member 119 which is slidably inserted in the valve housing 97 and is provided with a first valve seat 118 at a front end, a retainer 121 which partially defines the valve chamber 42 therein, the valve chamber 42 communicates with the input chamber 93 which communicates with the fluid pressure generation source 12, a valve body 122 that is slidably supported by the retainer 121 and is seated on the first valve seat 118 facing the inside of the valve chamber 42, a first valve spring 123 which urges the valve body 122 to be seated on the first valve seat 118 and is provided between the retainer 121 and the valve body 122, and a pressing rod 124 which abuts against the valve body 122, cooperates with and is connected to the control piston 41, and is inserted into the valve seat member 119 to be relatively movable in the axial direction.

The second valve means 117 includes a valve portion 125 provided in the valve seat member 119 and which is a component common to the first valve means 116, the stepped cylindrical valve housing 97 that slidably fits the valve seat member 119 so that a second valve seat 126 facing the valve chamber 42 is provided at a front end, the retainer 121, which is a component common to the first valve means 116, a second valve spring 127 that urges the valve portion 125 to be seated on the second valve seat 126 and is provided between the retainer 121 and the valve seat member 119; and the pressing rod 124, which is a component common to the first valve means 116.

The valve portion 125 of the second valve means 117 is provided in the valve seat member 119 rearward of the first valve seat 118. The valve body 122 can be seated on the second valve seat 126 while having a seal diameter larger than the seal diameter at the time of the valve body 122 being seated on the first valve seat 118.

The retainer 121 is attached to an outer periphery of the front end portion of the valve housing 97 by press fitting. A guide cylindrical portion 121b that has, at a front end, an end wall 121a having an open hole 128 defined therein and which communicates with the input chamber 93 in a central part thereof, and which is formed into a bottomed cylindrical shape, is integrally provided at a front portion of the retainer 121. The valve body 122 of the first valve means 116 is formed into a spherical shape. The valve body 122 is secured to a rear portion of a slide member 129. The first valve spring 123 is provided in a compression manner between the end wall 121a and the slide member 129.

The valve seat member 119 is provided with a valve hole 130 that opens to a central portion of the first valve seat 118, and a first insertion hole 131 coaxially communicating with the valve hole 130. The first insertion hole 131 includes a first taper hole portion 131a with a small diameter front end connected to the valve hole 130, a small diameter hole portion 131b with a front end connected to a large diameter rear end of the first taper hole portion 131a, a second taper hole portion 131c with a small diameter front end connected to a rear end of the small diameter hole portion 131b, and a large diameter hole portion 131d with a front end connected to a large diameter rear end of the second taper hole portion 131c. The rear end of the large diameter hole portion 131d opens rearward.

Meanwhile, a second insertion hole 132 with a front end opened to a central portion of the second valve seat 126 is provided in the valve housing 97. The valve seat member 119 is coaxially and movably inserted in the second insertion hole 132.

A pressing flange 124a abuts against the rear end of the valve seat member 119 to press and move the valve seat member 119 forward. The pressing flange 124a is integrally provided on the pressing rod 124. A restriction flange 97a, which restricts retraction limit of the pressing rod 124 by abutting against the pressing flange 124a from the rear, is integrally provided on the valve housing 97 and protrudes inward in the radial direction from the inner surface of the rear portion of the second insertion hole 132.

When the valve body 122 is separated from the valve seat 118 by pressing the valve body 122 with the front end of the pressing rod 124 in response to an advance of the control piston 41 due to an input of the brake operation force by the brake pedal 11 in the pressure increasing valve 43 as explained above, the first valve means 116 opens. After the first valve means 116 opens, the pressing rod 124 further advances and presses the valve seat member 119 forward via the pressing flange 124a. Accordingly, the valve portion 125 separates from second valve seat 126, and the second valve means 117 opens.

Thus, a flow passage 135, which causes the valve chamber 42 to communicate with the booster fluid pressure generation chamber 40 by opening of the pressure increasing valve 43, is defined inside the valve housing 97. The flow passage 135 includes an annular inner peripheral side communication portion 136 that is defined between the inner periphery of the valve seat member 119 and the outer periphery of the pressing rod 124, wherein a working fluid flows therein at the time of opening of the first valve means 116, an annular outer peripheral side communication portion 137 that is defined between the outer periphery of the valve member 119 and the inner periphery of the valve housing 97, wherein the working fluid flows therein at the time of opening of the second valve means 117, and an annular common communication portion 138 that is defined between the inner periphery of the valve housing 97 and the outer periphery of the pressing rod 124, wherein the inner peripheral side communication portion 136 and the outer peripheral side communication portion 137 communicate with the booster fluid pressure generation chamber 40.

At least one contraction portion 140 is formed between the outer periphery of the pressing rod 124 and the inner periphery of the valve seat member 119.

Thus, a front portion of the pressing rod 124 integrally includes a pressing shaft portion 124b that movably penetrates the valve hole 130 and causes a front end thereof to abut against the valve body 122, a circular truncated cone portion 124c that coaxially connects to a rear end of the pressing shaft portion 124b and has, on an outer periphery thereof, a taper surface 133 having an outside diameter that increases in a direction toward the rear, and a small diameter straight portion 124d having an outer peripheral surface with the same outside diameter as the large diameter end of the taper surface 133. The pressing rod 124 integrally includes, in a middle portion thereof, a large diameter straight portion 124e that is located forward of the pressing flange 124a and rearward of the small diameter straight portion 124d, and is formed to have a diameter larger than that of the small diameter straight portion 124d.

The contraction portion 140 is formed between an inner periphery of the small diameter hole portion 131b and an outer periphery of the small diameter straight portion 124d at least with advance of the pressing rod 124.

Further, a plurality of contraction portions 140 and 141, including the contraction portion 140 discussed above, are formed and arranged in series, between the outer periphery of the pressing rod 124 and the inner periphery of the valve seat member 119. The contraction portion 140 and the contraction portion 141 located rearward of the contraction portion 140 are formed between the outer periphery of the pressing rod 124 and the inner periphery of the valve seat member 119.

More specifically, the contraction portion 140 is formed between the outer periphery of the small diameter straight portion 124d at the front portion of the pressing rod 124 and the inner periphery of the small diameter hole portion 131b of the front portion of the first insertion hole 131. The contraction portion 141 is formed between the outer periphery of the large diameter straight portion 124e at the middle portion of the pressing rod 124, and the inner periphery of the large diameter hole portion 131d at the middle portion of the first insertion hole 131.

The rear end of the pressing rod 124 protrudes into the booster fluid pressure generation chamber 40. In the booster fluid pressure generation chamber 40, the pressing rod 124 is slidably fitted in a central portion of a disk-shaped rectifying member 142. The rectifying member 142 abuts against a surface of the valve housing 97 facing the booster fluid pressure generation chamber 40 and closes an open end of the flow passage 135 to the booster fluid pressure generation chamber 40. The surface of the rectifying member 142 facing the flow passage 135 is formed to be a flat surface 142a.

A spring receiving member 143 is press-fitted and fixed to the pressing rod 124 rearward of the rectifying member 142, and a spring 144 is provided in a compressed manner between the rectifying member 142 and the spring receiving member 143. Meanwhile, the front end of the first reaction piston 46 also protrudes into the booster fluid pressure generation chamber 40 coaxially with the pressing rod 124. The spring 114 is provided in a compressed manner between a retainer 145 that fits and abuts against the front portion of the first reaction piston 46 and the rectifying member 142. Thus, the rectifying member 142 is urged toward the valve housing 97 by the spring forces of the springs 114 and 144. The spring forces of the spring 114 and 144 are set so that the rectifying member 142 is spaced from the valve housing 97 according to the fluid pressure from the fluid pressure generation source 12 acting on the flow passage 135 when the first valve means 116 is opened.

The retainer 145 defines a valve chamber 146 between the first reaction piston 46 and the pressing rod and which communicates with the booster fluid pressure generation chamber 40. The rear end portion of the pressing rod 124 is slidably fitted into a central portion of the retainer 145. A valve seat 147 is provided in the front end of the first reaction piston 46 and faces the valve chamber 146. A hemispherically shaped valve portion 148 is provided in the rear end of the pressing rod 124 and is able to be seated on the valve seat 147.

The pressure reducing valve 44 includes the valve seat 147 and the valve portion 148. The first reaction piston 46 is coaxially provided with a valve hole 149 that opens into a central part of the valve seat 147, and a release passage 150 formed to have a diameter larger than the valve hole 149. A front end of the release passage 150 communicates with the valve hole 149 and extends to the rear end of the first reaction piston 46. The end wall 41a of the front end of the control piston 41 abuts against the rear end of the first reaction piston 46, and therefore, the rear end of the release passage 150 is substantially closed.

A plurality of communication holes 151 are defined in the middle portion of the first reaction piston 46. The communication holes 151 have outer ends communicating with a gap between the outer periphery of the first reaction piston 46 and the inner periphery of the second reaction piston 47 and inner ends communicating with the release passage 150 backward of the seal member 98 mounted on the outer periphery of the first reaction piston 46. At the time of opening of the pressure reducing valve 44, working fluid from the release passage 150 flows into the release chamber 45 via the communication holes 151, and a gap defined between the outer periphery of the first reaction piston 46 and the inner periphery of the second reaction piston 47.

In such a fluid pressure booster 13, the brake operation input from the brake pedal 11 is input to the control piston 41 via the stroke simulator 14, and a forward pressing force acts on the first reaction piston 46 from the control piston 41. Thus, in a state in which the amount of advancing movement of the control piston 41 relative to the backup piston 39 is less than a predetermined value, only the first reaction piston 46 abuts against the control piston 41. The valve portion 148 is seated on the valve seat 147 according to the advance of the first reaction piston 46 to close the pressure reducing valve 44 and block the communication between the booster fluid pressure generation chamber 40 and the release chamber 45. Moreover, the control piston 41, the first reaction piston 46 and the pressing rod 124 advance further. According to the advance of the pressing rod 124, in the pressure increasing valve 43, the valve body 122 is first separated from the first valve seat 118 at the front end of the valve seat member 119 to open the first valve means 116. Next, the pressing rod 124 further advances, wherein the valve seat member 119 is pressed with the pressing rod 124, and the valve portion 125 is separated from the second valve seat 126 to open the second valve means 117.

In the closing state of the pressure reducing valve 44, the fluid pressure in the booster fluid pressure generation chamber 40 acts on the front end of the first reaction piston 46, the first reaction piston 46 and the control piston 41 are retracted so that the brake operation input from the brake pedal 11 and the fluid pressure based on the fluid pressure in the booster fluid pressure generation chamber 40 are balanced to open the pressure reducing valve 44 and close the pressure increasing valve 43. The opening and closing of the pressure increasing valve 43 and the pressure reducing valve 44 are repeated. Thus, the output fluid pressure of the fluid pressure generation source 12 is regulated to a booster fluid pressure according to the brake operation input from the brake pedal 11, and works on the booster fluid pressure generation chamber 40. When the amount of advancing movement of the control piston 41 relative to the backup piston 39 reaches a predetermined value or more, the first reaction piston 46 and the second reaction piston 47 abut against the control piston 41. The fluid pressure force that presses the second reaction piston 47 backward by the fluid pressure of the input chamber 93 and the spring force of the reaction spring 48 are also added as the reaction forces, wherein the reaction force that acts on the control piston 41 is increased.

With reference to FIG. 1, the connection port 57 defined in the body 17 to communicate with the booster fluid pressure working chamber 22 is connected to the fluid pressure generation source 12 via a normally closed automatic brake pressurizing linear solenoid valve 154. The connection port 57 is also connected to the third reservoir chamber 31c via a normally closed regenerative cooperative pressure reducing linear solenoid valve 155. Specifically, the normally closed automatic brake pressurizing linear solenoid valve 154 is provided between the booster fluid pressure working chamber 22 and the fluid pressure generation source 12. The normally closed regenerative cooperative pressure reducing linear solenoid valve 155 is provided between the booster fluid pressure working chamber 22 and the reservoir 31. In addition, the automatic brake pressurizing linear solenoid valve 154 and the regenerative cooperative pressure reducing linear solenoid valve 155 are provided in the body 17 together with the fluid pressure sensor 63.

Further, the output port 59 communicating with the booster fluid pressure generation chamber 40 is connected to the connection port 57 via a normally open automatic brake pressure reducing linear solenoid valve 156 and a normally open regenerative cooperative pressurizing linear solenoid valve 157, which are connected in series. A first one-way valve 158 is connected to the automatic brake pressure reducing linear solenoid valve 156 in parallel to allow the working fluid to flow from the output port 59 toward the connection port 57. A second one-way valve 159 is connected to the regenerative cooperative pressurizing linear solenoid valve 157 in parallel to allow the working fluid to flow from the connection port 57 toward the output port 59.

A brake operation amount detecting fluid pressure sensor 160 is connected to the output port 59 and the automatic brake pressure reducing linear solenoid valve 156. An automatic brake feedback control fluid pressure sensor 161 is connected to the regenerative cooperative pressurizing linear solenoid valve 157 and the connection port 57.

As described above, the normally closed automatic brake pressurizing linear solenoid valve 154 is provided between the fluid pressure generation source 12 and the booster fluid pressure working chamber 22, and the normally open automatic brake pressure reducing linear solenoid valve 156 and the first one-way valve 158 are connected to the automatic brake pressure reducing linear solenoid valve 156 in parallel to allow the working fluid to flow from the booster fluid pressure generation chamber 40 toward the booster fluid pressure working chamber 22 and are provided between the booster fluid pressure generation chamber 40 and the booster fluid pressure working chamber 22. Thus, even at the time of non-operation of the brake pedal 11, opening and closing of the automatic brake pressurizing linear solenoid valve 154 and the automatic brake pressure reducing linear solenoid valve 156 are controlled to regulate the fluid pressure of the booster fluid pressure working chamber 22, wherein automatic brake control such that the working fluid pressure acts on the wheel brakes B1 to B4 in the non-braking operation state can be performed. In addition, when the brake pedal 11 is operated with the automatic brake pressure reducing linear solenoid valve 156 being closed to actuate the pressure increasing valve 43 at the time of automatic braking, so that fluid pressure higher than the fluid pressure in the booster fluid pressure working chamber 22 is generated in the booster fluid pressure generation chamber 40, the fluid pressure in the booster fluid pressure generation chamber 40 is caused to act on the booster fluid pressure working chamber 22 via the first one-way valve 158 to actuate the master cylinder M in the same way as at the time of normal brake operation.

Further, the normally closed regenerative cooperative pressure reducing linear solenoid valve 155 is provided between the booster fluid pressure working chamber 22 and the reservoir 31. The normally open regenerative cooperative pressurizing linear solenoid valve 157 and the second one-way valve 159 connected to the regenerative cooperative pressurizing linear solenoid valve 157 in parallel to allow the working fluid to flow from the booster fluid pressure working chamber 22 toward the booster fluid pressure generation chamber 40 are provided between the booster fluid pressure generation chamber 40 and the booster fluid pressure working chamber 22. Thus, at the time of regeneration in the brake operation state, the opening and closing of the regenerative cooperative pressurizing linear solenoid valve 157 and the regenerative cooperative pressure reducing linear solenoid valve 155 are controlled to regulate the fluid pressure in the booster fluid pressure working chamber 22. Thus, working fluid pressure offset from the pressure at the time of normal braking can be output from the master cylinder M, and when the brake pedal 11 is returned at the time of closing of the regenerative cooperative pressurizing linear solenoid valve 151, the fluid pressure in the booster fluid pressure working chamber 22 is released toward the reservoir 31 via the second one-way valve 159.

With reference to FIGS. 1 and 2, the stroke simulator 14 includes an input piston 164 that forms a stroke fluid chamber 163 in a space from the end wall 41a at the front end of the control piston 41, and is fitted to the control piston 41 fluid-tightly and slidably in the axial direction; a slide member 165 that is slidably housed in the control piston 41 forward of the input piston 164; an elastic body 166 that is formed into a cylindrical shape from an elastic material, such as a rubber, and is mounted between the input piston 164 and the slide member 165; and a coil spring 167 that has a spring load smaller than the elastic body 166 and which is mounted between the slide member 165 and the end wall 41a.

The input piston 164 is slidably fitted to the rear portion of the control piston 41 so that a retraction limit position is restricted, and a front end portion of an input rod 168 connected to the brake pedal 11 is oscillably connected to the input piston 164. More specifically, the brake operation force according to the operation of the brake pedal 11 is input to the input piston 164 via the input rod 168, and the input piston 164 is operated to advance according to the input of the brake operation force. Further, an annular seal member 169 that comes into slide contact with the inner periphery of the control piston 41 is mounted to the outer periphery of the input piston 164.

The elastic body 166 and the coil spring 167 are mounted in series between the input piston 164 and the control piston 41 so that the spring force exerted by the coil spring 167 acts on the control piston 41 in early stages of operation of the brake pedal 11. After the slide member 165 abuts against the end wall 41a of the front end of the control piston 41 and thereby, the action of the spring force of the coil spring 167 onto the control piston 41 is finished, the elastic deformation of the elastic body 166 is started.

A front end portion of a guide shaft 170 that is coaxial with the control piston 41 and penetrates through the elastic body 166 is press-fitted in a central portion of the slide member 165. A rear end portion of the guide shaft 170 is slidably fitted to the input piston 164. A plurality of through holes 171 that provide communication between the release chamber 45 that faces the front surface of the end wall 41a and the stroke fluid chamber 163 are defined in the end wall 41a the same distance from the center of the control piston 41. The working fluid is introduced into the stroke fluid chamber 163 in the control piston 41 via the through holes 171.

The through holes 171 are closed by a seat stopper 115 secured to the backup piston 39 when the control piston 41 advances by a predetermined advance stroke or more. Thus, until the through holes 171 are closed by the seat stopper 115 and the stroke fluid chamber 163 is brought into a fluid pressure lock state at the time the control piston 41 advances, a gap between the elastic body 166 in the control piston 41 and the control piston 41 communicates with the release chamber 45 via the through holes 171. More specifically, the stroke fluid chamber 163 communicates with the release chamber 45, that is, the reservoir 31 at the advance stroke of the control piston 41 with the working fluid is sealed in the control piston 41.

In such a stroke simulator 14, the input piston 164 advances according to the brake operation of the brake pedal 11, and the stroke proportionally increases according to the input load by compressing the coil spring 167 until the advance stroke reaches a certain value. Subsequently, when the input piston 164 advances while compressing the elastic body 166 in the axial direction, the elastic body 166 elastically deforms according to the compression in the axial direction. The elastic deformation of the elastic body 166 is sequentially inhibited from the front by the inner periphery of the control piston 41 in accordance with increase of the compression force in the axial direction. The change amount of the input load of the brake pedal 11 relative to the operation stroke increases.

Further, when the through holes 171 at the front end of the control piston 41 are closed at the time of the advance stroke of a predetermined amount or more of the control piston 41, the stroke fluid chamber 163 is brought into a sealed state, and relative movement in the advancing direction of the input piston 164 relative to the control piston 41 is inhibited. Increase in the stroke of the brake pedal 11, which becomes ineffective by the stroke simulator 14, and the reaction force, are suppressed at the time the fluid pressure of the fluid pressure generation source 12 decreases.

Describing the operation of the invention next, at least one (one in the presently described embodiment) contraction portion 140 is formed between the outer periphery of the front portion of the pressing rod 124 that forms a part of the pressure increasing valve 43 and the inner periphery of the front portion of the valve seat member 119. Even if a large fluid pressure difference occurs between the fluid pressure generation source 12 and the booster fluid pressure generation chamber 40 at the early stages of opening of the pressure increasing valve 43, the fluid velocity is suppressed in the contraction portion 140. Thus, an abrupt fluid pressure variation does not occur at the early stages of opening of the pressure increasing valve 43, and generation of an abnormal sound is suppressed.

Further, the front part of the pressing rod 124 integrally includes the pressing shaft portion 124b that movably penetrates through the opened valve hole 130 in the central portion of the first valve seat 118, and causes the front end thereof to abut against the valve body 122. The circular truncated cone portion 124c is coaxially continuous with the rear end of the pressing shaft portion 124b and has, on the outer periphery thereof, the taper surface 133 having an outside diameter that becomes larger toward the rear. The small diameter straight portion 124d has an outer peripheral surface with the same outside diameter as the large diameter end of the taper surface 133. The contraction portion 140 is formed between the inner periphery of the valve seat member 119 and the outer periphery of the small diameter straight portion 124d at least with advance of the pressing rod 124. Thus, the flow velocity of the working fluid is reduced by the advance of the pressing rod 124, and generation of a working sound that occurs near the valve hole 130 is suppressed.

Further, a plurality of contraction portions 141, including the contraction portion 140, are defined and arranged in series, between the outer periphery of the pressing rod 124 and the inner periphery of the valve seat member 119. The contraction portion 140 is formed between the small diameter hole portion 131b and the outer periphery of the small diameter straight portion 124d. The contraction portion 141 is formed between the large diameter hole portion 131d defined in the valve seat member 119 and the outer periphery of the large diameter straight portion 124e of the pressing rod 124. Thus, the working fluid that flows toward the booster fluid pressure generation chamber 40 in accordance with the opening of the pressure increasing valve 43 passes through the plurality of contraction portions 140 and 141, wherein any abrupt fluid pressure variation is effectively suppressed, and generation of an abnormal sound is suppressed.

Although a preferred embodiment of the present invention has been described above, the present invention is not limited to the above described embodiment, and various design changes can be made without departing from the gist of the present invention.

For example, in the above described embodiment, the pressure increasing valve 43 includes the first and second valve means 116 and 117 that sequentially open according to the increase in the input brake operation. However, the present invention can also be applied to a fluid pressure booster including a pressure increasing valve having a single valve seat and a single valve body.

What is claimed is:

1. A fluid pressure booster for a braking device, comprising:
   a control piston on which an input brake operation acts in an advancing direction, and a reaction force based on a fluid pressure generated by a booster fluid pressure generation chamber for actuating a master piston of a master cylinder acts in a retracting direction;
   a pressure increasing valve which includes a cylindrical valve seat member which is provided, at a front end thereof, with a valve seat facing a valve chamber communicating with a fluid pressure generation source, a valve body that is urged by a spring toward a side where the valve body is seated on the valve seat and is housed in the valve chamber, and a pressing rod that is coaxially inserted in the valve seat member and pushes the valve body with the front end so that the valve body is separated from the valve seat, and which opens according to the advance of the control piston, and is provided between the valve chamber and the booster fluid pressure generation chamber; and
   a pressure reducing valve provided between a release chamber communicating with a reservoir and the booster fluid pressure generation chamber, the pressure reducing valve closes when the control piston advances and opens when the control piston retracts, wherein a plurality of contraction portions are formed in series in a flow direction from the valve chamber to the booster fluid pressure generation chamber between an outer periphery of a front portion of the pressing rod and an inner periphery of a front portion of the valve seat member in a flow passage through which a working fluid flows such that a distance between the outer periphery and the inner periphery is reduced at each contraction portion.

2. The fluid pressure booster for a brake device according to claim 1, wherein the front portion of the pressing rod integrally includes:

a pressing shaft portion that movably penetrates through a valve hole defined in a central portion of the valve seat and which is provided at the front end of the valve seat member and is capable of abutting against the valve body with a front end;

a circular truncated cone portion that is coaxially continuous with a rear end of the pressing shaft portion and has, on an outer periphery, a taper surface having an outside diameter which gets larger in a direction extending rearward; and a straight portion having an outer peripheral surface with the same outside diameter as a large diameter end of the taper surface; and the contraction portion is formed between the inner periphery of the valve seat member and the outer periphery of the straight portion at least with advance of the pressing rod.

3. The fluid pressure booster for a braking device according to claim 1, wherein the valve seat member is provided with a small diameter hole portion, and at least one large diameter hole portion that is coaxially disposed rearward of the small diameter hole portion and is formed to have a diameter larger than that of the small diameter hole portion, and the contraction portions are formed, respectively, between the outer periphery of the pressing rod, and inner peripheries of the small diameter hole portion and the large diameter hole portion.

4. The fluid pressure booster for a braking device according to claim 2, wherein the valve seat member is provided with a small diameter hole portion, and at least one large diameter hole portion that is coaxially disposed rearward of the small diameter hole portion and is formed to have a diameter larger than that of the small diameter hole portion, and the contraction portions are formed, respectively, between the outer periphery of the pressing rod, and inner peripheries of the small diameter hole portion and the large diameter hole portion.

5. The fluid pressure booster for a braking device according to claim 1, wherein a velocity of a working fluid flowing through the pressure increasing valve is suppressed in the first contraction portion.

6. A fluid pressure booster for a braking device, comprising:

a control piston on which an input brake operation acts in an advancing direction, and a reaction force based on a fluid pressure generated by a booster fluid pressure generation chamber for actuating a master piston of a master cylinder acts in a retracting direction;

a pressure increasing valve which includes a cylindrical valve seat member which is provided, at a front end thereof, with a valve seat facing a valve chamber communicating with a fluid pressure generation source, a valve body that is urged by a spring toward a side where the valve body is seated on the valve seat and is housed in the valve chamber, and a pressing rod that is coaxially inserted in the valve seat member and pushes the valve body with the front end so that the valve body is separated from the valve seat, and which opens according to the advance of the control piston, and is provided between the valve chamber and the booster fluid pressure generation chamber; and a pressure reducing valve provided between a release chamber communicating with a reservoir and the booster fluid pressure generation chamber, the pressure reducing valve closes when the control piston advances and opens when the control piston retracts, wherein at least one first contraction portion is formed between an outer periphery of the pressing rod and an inner periphery of the valve seat member such that a distance between the outer periphery and the inner periphery is reduced at the first contraction portion in a flow direction from the valve chamber to the booster fluid pressure generation chamber; and wherein the pressing rod integrally includes:

a pressing shaft portion that movably penetrates through a valve hole defined in a central portion of the valve seat and which is provided at the front end of the valve seat member and is capable of abutting against the valve body with a front end;

a circular truncated cone portion that is coaxially continuous with a rear end of the pressing shaft portion and has, on an outer periphery, a taper surface having an outside diameter which gets larger in a direction extending rearward; and a straight portion having an outer peripheral surface with the same outside diameter as a large diameter end of the taper surface; and the contraction portion is formed between the inner periphery of the valve seat member and the outer periphery of the straight portion at least with advance of the pressing rod wherein the pressing rod further integrally includes:

a second circular truncated cone portion that is coaxially continuous with a rear end of the straight portion and has, on an outer periphery a second taper surface having an outside diameter which gets larger in a direction extending rearward; and a second straight portion having an outer peripheral surface with the same outside diameter as a large diameter end of the second taper surface, wherein a second of the contraction portions is formed between an inner periphery of a large diameter hole portion of the valve seat member and the outer periphery of the second straight portion; and wherein a working fluid flows through the contraction portions.

* * * * *